United States Patent
Grost et al.

(10) Patent No.: US 8,688,451 B2
(45) Date of Patent: Apr. 1, 2014

(54) DISTINGUISHING OUT-OF-VOCABULARY SPEECH FROM IN-VOCABULARY SPEECH

(75) Inventors: Timothy J. Grost, Clarkston, MI (US); Rathinavelu Chengalvarayan, Naperville, IL (US)

(73) Assignee: General Motors LLC, Detroit, MI (US)

( * ) Notice: Subject to any disclaimer, the term of this patent is extended or adjusted under 35 U.S.C. 154(b) by 2097 days.

(21) Appl. No.: 11/382,789

(22) Filed: May 11, 2006

(65) Prior Publication Data

US 2007/0265849 A1 Nov. 15, 2007

(51) Int. Cl.
*G10L 15/00* (2013.01)
*G10L 15/18* (2013.01)
*G10L 21/00* (2013.01)
*H04M 1/64* (2006.01)

(52) U.S. Cl.
USPC ........... 704/255; 704/231; 704/236; 704/239; 704/249; 704/252; 704/254; 704/257; 704/275; 379/88.01; 379/88.02

(58) Field of Classification Search
USPC ......... 704/231, 236, 239, 249, 251, 254, 252; 379/88.01, 88.02
See application file for complete search history.

(56) References Cited

U.S. PATENT DOCUMENTS

| | | | |
|---|---|---|---|
| 5,675,706 A | | 10/1997 | Lee et al. |
| 5,712,957 A | * | 1/1998 | Waibel et al. ................ 704/240 |
| 5,737,489 A | * | 4/1998 | Chou et al. .................... 704/256 |
| 5,832,430 A | * | 11/1998 | Lleida et al. .................. 704/256 |
| 5,991,720 A | * | 11/1999 | Galler et al. ................ 704/256.5 |
| 6,226,612 B1 | * | 5/2001 | Srenger et al. ............. 704/256.2 |
| 6,233,553 B1 | * | 5/2001 | Contolini et al. ............. 704/220 |
| 6,473,735 B1 | * | 10/2002 | Wu et al. ........................ 704/240 |
| 6,571,210 B2 | * | 5/2003 | Hon et al. ...................... 704/251 |
| 6,701,293 B2 | * | 3/2004 | Bennett et al. ................ 704/251 |

(Continued)

FOREIGN PATENT DOCUMENTS

WO  WO 2005122144 A1 * 12/2005 ............. G10L 21/00

OTHER PUBLICATIONS

Levow, Gina-Anne / Mari Broman Olsen, (1999), "Modeling the Language Assessment Process and Result: Proposed Architecture for Automatic Oral Proficiency Assessment". Proceedings of Computer mediated Language Assessment and Evaluation in Natural Language Processing Workshop, ACL '99, 24-31.*

(Continued)

*Primary Examiner* — Paras D Shah
(74) *Attorney, Agent, or Firm* — Anthony Luke Simon; Reising Ethington P.C.

(57) ABSTRACT

A speech recognition method includes receiving input speech from a user, processing the input speech using a first grammar to obtain parameter values of a first N-best list of vocabulary, comparing a parameter value of a top result of the first N-best list to a threshold value, and if the compared parameter value is below the threshold value, then additionally processing the input speech using a second grammar to obtain parameter values of a second N-best list of vocabulary. Other preferred steps include: determining the input speech to be in-vocabulary if any of the results of the first N-best list is also present within the second N-best list, but out-of-vocabulary if none of the results of the first N-best list is within the second N-best list; and providing audible feedback to the user if the input speech is determined to be out-of-vocabulary.

18 Claims, 3 Drawing Sheets

(56) References Cited

U.S. PATENT DOCUMENTS

| | | | |
|---|---|---|---|
| 6,735,562 B1* | 5/2004 | Zhang et al. | 704/240 |
| 6,757,652 B1* | 6/2004 | Lund et al. | 704/254 |
| 6,778,959 B1* | 8/2004 | Wu et al. | 704/256 |
| 6,850,886 B2* | 2/2005 | Abrego et al. | 704/240 |
| 6,957,184 B2* | 10/2005 | Schmid et al. | 704/257 |
| 7,072,750 B2* | 7/2006 | Pi et al. | 701/36 |
| 7,103,543 B2* | 9/2006 | Hernandez-Abrego et al. | 704/240 |
| 7,181,397 B2* | 2/2007 | Ma et al. | 704/251 |
| 7,392,189 B2* | 6/2008 | Hennecke et al. | 704/254 |
| 8,271,283 B2* | 9/2012 | Jeong et al. | 704/254 |
| 2003/0009335 A1* | 1/2003 | Schalkwyk et al. | 704/257 |
| 2003/0023437 A1* | 1/2003 | Fung | 704/236 |
| 2003/0125948 A1* | 7/2003 | Lyudovyk | 704/257 |
| 2003/0236664 A1* | 12/2003 | Sharma | 704/251 |
| 2004/0111259 A1* | 6/2004 | Miller et al. | 704/231 |
| 2004/0254790 A1* | 12/2004 | Novak et al. | 704/240 |
| 2005/0049871 A1* | 3/2005 | Gong | 704/255 |
| 2005/0055210 A1* | 3/2005 | Venkataraman et al. | 704/255 |
| 2005/0234723 A1* | 10/2005 | Arnold et al. | 704/257 |
| 2006/0020464 A1* | 1/2006 | Ju et al. | 704/257 |
| 2006/0069564 A1* | 3/2006 | Allison et al. | 704/257 |
| 2006/0136207 A1* | 6/2006 | Kim et al. | 704/249 |
| 2006/0178882 A1* | 8/2006 | Braho et al. | 704/240 |
| 2007/0124147 A1* | 5/2007 | Gopinath et al. | 704/257 |

OTHER PUBLICATIONS

Okimoto, Y. WO 2005122144. Human Translation of Previously Cited Document, p. 1-60.*

* cited by examiner

DISTINGUISHING OUT-OF-VOCABULARY SPEECH FROM IN-VOCABULARY SPEECH

TECHNICAL FIELD

This invention relates to automated speech recognition (ASR) and, more particularly, to recognition of pre-defined vocabulary.

BACKGROUND OF THE INVENTION

ASR technologies enable microphone-equipped computing devices to interpret speech and thereby provide an alternative to conventional human-to-computer input devices such as keyboards or keypads. Many telecommunications devices are equipped with ASR technology to detect the presence of discrete speech such as a spoken nametag or control vocabulary like numerals, keywords, or commands. For example, ASR can match a spoken command word with a corresponding command stored in memory of the telecommunication device to carry out some action, like dialing a telephone number. Also, an ASR system is typically programmed with predefined acceptable vocabulary that the system expects to hear from a user at any given time, known as in-vocabulary speech. For example, the ASR system may expect to hear command words such as Call, Dial, Directory, Exit, Delete, or the like, such as at a main menu dialog with the user.

In contrast, out-of-vocabulary speech occurs when a user speaks a word or subword that is not within the predefined vocabulary of commands, numerals, keywords, or nametags. Out-of-vocabulary speech is particularly frequent when a user is not familiar with the predefined acceptable vocabulary. For example, a novice user may speak out-of-vocabulary saying something like "Okay" instead of an expected word like "Yes" and the ASR system may incorrectly interpret the speech as some other expected command word like "Goodbye". Accordingly, the ASR system may process the incorrect command, or may repetitively ask the user to repeat the command. In either case, the user becomes frustrated. One solution to this problem is to audibly prompt the user with acceptable commands at every juncture in ASR dialogs. But this approach is too repetitious and frustrates users who are already familiar with the acceptable commands.

SUMMARY OF THE INVENTION

According to one aspect of the present invention, there is provided a speech recognition method comprising the steps of:
 (a) receiving input speech from a user;
 (b) processing the input speech using a first grammar to obtain parameter values of a first N-best list of vocabulary;
 (c) comparing at least one parameter value of a top result of the first N-best list to at least one predetermined threshold value; and
 (d) subsequently processing the input speech using a second grammar to obtain parameter values of a second N-best list of vocabulary, if the compared at least one parameter value is below the at least one predetermined threshold value.

Preferably, the speech recognition method can also include one or both of the following additional steps:
 (e) determining the input speech to be in-vocabulary, if any of the results of the first N-best list is also present within the second N-best list, but out-of-vocabulary if none of the results of the first N-best list is within the second N-best list; or
 (f) providing audible feedback to the user if the input speech is determined to be out-of-vocabulary.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
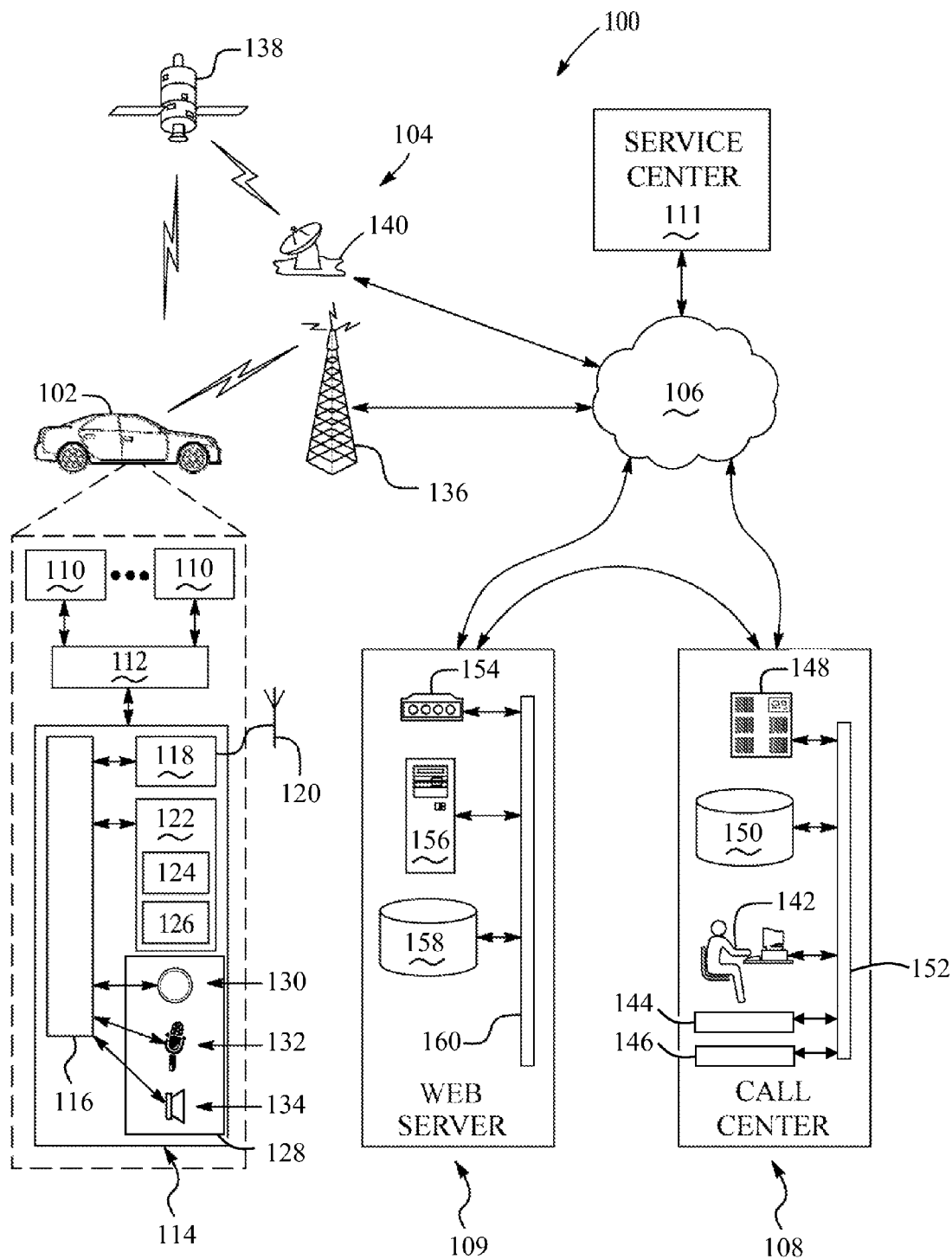
FIG. 1 is a block diagram depicting an example of a telematics system that can be used to implement exemplary methods of distinguishing out-of-vocabulary speech from in-vocabulary speech.
Figure 2:
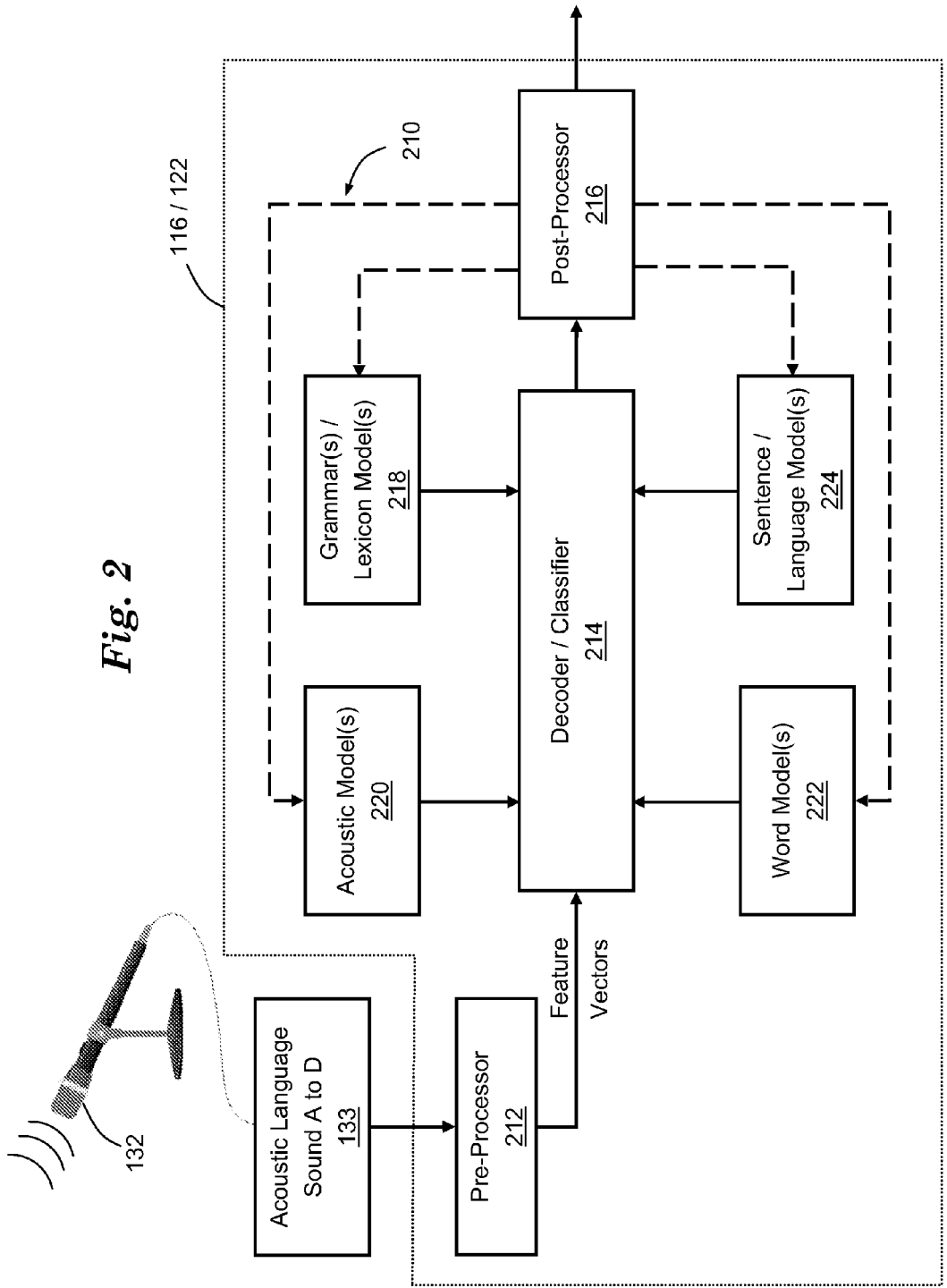
FIG. 2 is a block diagram illustrating an example ASR architecture that can be embedded within the telematics system of FIG. 1 and used to implement exemplary methods of distinguishing out-of-vocabulary speech from in-vocabulary speech.

An exemplary operating environment enabled with automated speech recognition (ASR) is illustrated in FIGS. 1 and 2, and can be used to implement exemplary embodiments of methods of distinguishing out-of-vocabulary speech from in-vocabulary speech. The methods can be particularly useful for recognizing discrete speech such as a nametag, or control vocabulary like numerals, keywords, or commands. The methods can include use of multiple vocabularies for efficient retrieval of, or association with, stored in-vocabulary terms, and are discussed in detail further below in conjunction with FIG. 3.

The methods can be carried out using any suitable ASR-enabled system. Preferably, however, the methods are carried out in conjunction with an ASR-enabled telematics system 100, which can include a motor vehicle 102 carrying one or more occupants or users, a wireless communication system 104 for wirelessly communicating with the vehicle 102 and a second communications system 106 that, in turn, communicates with a call center 108 that provides services to the vehicle 102 by processing and storing data and communicating with the vehicle 102. Additionally, the telematics system 100 can also include a web server 109 in communication with the vehicle 102 and call center 108 for providing Internet services thereto, and a vehicle service center 111 in communication with the aforementioned elements to provide services to the vehicle 102.

The exemplary telematics system 100 generally facilitates numerous services to the occupant(s) of the vehicle 102, including vehicle navigation, turn-by-turn driving directions, telephony including automated audio interaction with the occupant, emergency services, vehicle diagnostics, vehicle system updates, and ASR. For this purpose the telematics system 100 processes data and instructions as well as facilitates wireless voice and data transfer between hardware located on the vehicle 102 and hardware in the remote call center 108. For example, the telematics system 100 enables the vehicle occupant to initiate voice communication, for example, with the call center 108 or the service center 111.

Also, the telematics system 100 enables electronic communication between the vehicle 102 and the web server 109 for various purposes such as transmitting and/or receiving information such as updated voice messages, email, news, or the like.

Motor Vehicle

The motor vehicle 102 is depicted in the illustrated embodiment as a passenger vehicle, and it will be appreciated that any other mobile vehicles including marine vehicles, aircraft, and other automobiles such as vans, trucks, etc., can be used without departing from the scope of the invention. Various electronic modules are located on the vehicle 102 and include one or more vehicle sub-systems or vehicle system modules (VSMs) 110, an on-board vehicle communication bus 112, and one or more vehicle telematics units 114 connected by the bus 112 to the VSM's 110.

VSM's

The VSM's 110 facilitate suitable on-board functions such as vehicle diagnostics, monitoring, control, reporting, and/or other functions. For example, the VSM's 110 can be used for controlling engine operation, monitoring and deploying air bags or other safety devices, and/or diagnosing vehicle systems via various vehicle sensors. The VSM's 110 broadly represent all of the subsystems throughout the vehicle with which the telematics unit 114 interacts. In a specific example, if the call center 108 sends a signal to the vehicle 102 to unlock the vehicle doors, then the telematics unit 114 instructs a door lock VSM to unlock the doors.

Vehicle Communication Bus

The vehicle communication bus 112 facilitates interactions among the various vehicle systems such as the VSM's 110 and the telematics unit 114 and uses any suitable network communication configuration, such as a Controller Area Network (CAN), Media Oriented System Transport (MOST), Local Interconnect Network (LIN), Ethernet (10 base T, 100 base T), Local Area Network (LAN), ISO Standard 9141, ISO Standard 11898 for high-speed applications, ISO Standard 11519 for lower speed applications, SAE Standard J1850 for high-speed and lower speed applications, and/or the like.

Vehicle Telematics Unit

The vehicle telematics unit 114 facilitates communication and interactivity between the vehicle 102 or occupant thereof, and various remote locations including the call center 108, web server 109, and/or and service center 111. The telematics unit 114 interfaces with the various VSM's 110 via the vehicle communication bus 112. The telematics unit 114 is implemented in any suitable configuration and preferably includes a processor 116, a communications device 118 for wireless communication to and from the vehicle 102 via one or more antennas 120, a memory 122 to store programs 124 and/or one or more databases 126, and a user interface 128. The telematics unit 114 also includes any suitable device for intercommunicating the aforementioned devices.

Telematics Processor

The telematics processor 116 is implemented in any of various ways known to those skilled in the art, such as in the form of a controller, microprocessor, microcontroller, host processor, vehicle communications processor, Application Specific Integrated Circuit (ASIC), or as any other appropriate processor type. Alternatively, the processor 116 can work in conjunction with a central processing unit (not shown) performing the function of a general purpose computer. The processor 116 can be associated with other suitable devices (not shown) such as a real time clock to provide accurate date and time information. The processor 116 executes the one or more computer programs 124 stored in memory 122 such as to carry out various functions of monitoring and processing data and communicating the telematics unit 114 with the VSM's 110, vehicle occupants, and remote locations. For example, the processor 116 executes one or more speech recognition programs and processes speech recognition data to carry out ASR. Further, the processor 116 controls, generates, and accepts signals transmitted between the telematics unit 114 and call center 108 via the communications systems 104, 106, and between the telematics unit 114 and the vehicle communication bus 112 that is connected to the various mechanical and/or electronic VSM's 110. In one mode, these signals are used to activate programming and operation modes of the VSM's 110.

Telematics Memory

The telematics memory 122 is any electronic storage device that provides computer-readable storage of data and programs for use by the processor 116. The memory 122 includes volatile, and/or non-volatile memory storage, such as RAM, NVRAM, hard disks, flash memory, etc., and can be implemented as one or more separate physical devices. The programs 124 include one or more computer programs that are executed by the processor 116 to carry out the various functions of the telematics unit 114. For example, the software or programs 124 resident in the memory 122 and executed by the processor 116 are used for monitoring, recognizing, and/or recording utterances or speech from a vehicle occupant via the user interface 128. The database 126 are used to store voice message data, diagnostic trouble code data, or other diagnostic data. For example, the database 126 includes speech recognition databases such as acoustic models, vocabularies, grammars, and the like. This database 126 can be implemented as database tables that enable lookups to be performed on data stored in the database 126, and this can be done using known indexing techniques and/or database queries, or by straight serial searching through such tables. These and other database storage and lookup techniques are well known to those skilled in the art.

Telematics Communications Device

The telematics communications device 118 provides wireless communication via cellular satellite, or other wireless path, and facilitates both voice and data communications. For example, the wireless communications device 118 and associated antenna 120 transmits and receives voice and data to and from the wireless communication system 104 so that the telematics unit 114 communicates with the call center 108 via the second communication system 106. Accordingly, the wireless communications device 118 is preferably equipped with cellular communications software and hardware such as a wireless modem or embedded cellular telephone, which can be analog, digital, dual mode, dual band, multi mode, and/or multi-band, and can include a separate processor and memory. Also, the wireless communications device 118 preferably uses cellular technology such as CDMA or GSM, but could also utilize proprietary or other wireless technologies to communicate with the wireless communication system 104. The wireless communications device 118 can include additional or integrated functionality such as satellite communications software and hardware including a global positioning system (GPS) receiver. Such a GPS receiver receives location and time data from the wireless communication system 104 and conveys corresponding latitude and longitude information to the telematics unit 114 to enable the telematics unit 114 to process, store, and send location information to carry out services such as navigation, driving directions, and emergency services.

Telematics User Interface

The telematics user interface 128 includes one or more input and output modules and/or devices to receive input from, and transmit output to, a vehicle occupant. As used herein, the term interface broadly means any suitable form of electronic device or adapter, or even a software module or adapter, which enables a user or a piece of equipment to communicate with or control another piece of equipment. The interface described herein can be a single interface or can be implemented as separate interfaces or any combination thereof.

The input devices include one or more of the following devices: one or more tactile devices 130 such as one or more pushbutton switches, keypads, or keyboards; one or more microphones 132; or any other type of input device. The tactile input device 130 enables user-activation of one or more functions of the telematics unit 114 and includes a pushbutton switch, keypad, keyboard, or other suitable input device located within the vehicle in reach of the vehicle occupants. For example, the tactile input device 130 can be used to initiate telecommunications with remote locations, such as the call center 108 or cellular telephones and/or to initiate vehicle updates, diagnostics, or the like. The microphone 132 allows a vehicle occupant to provide voice commands or other verbal input into the telematics unit 114, as well as voice communication with various remote locations via the communications device 122. Voice commands from the vehicle occupant are interpreted using a suitable analog-to-digital interface or digital signal processor such as a sound card (not shown) between the microphone 132 and the processor 116 and voice recognition programs and data stored within the memory 122.

The output devices include one or more speakers 134, a visual display device such as a liquid crystal or plasma screen (not shown), or any other types of output devices. The speaker(s) 134 enable the telematics unit 114 to communicate with the vehicle occupant through audible speech, signals, or audio files, and can be stand-alone speakers specifically dedicated for use with the telematics unit 114, or they can be part of the vehicle audio system. A suitable interface device such as a sound card (not shown) can be interposed between the speakers 134 and the telematics processor 116.

Although depicted in FIG. 1 as separate individual modules, it will be appreciated by those skilled in the art that many of the components of the telematics unit 114 can be integrated together, or integrated and/or shared with other vehicle systems. For example, the memory 122 can be incorporated into the processor 116 or located outside of telematics unit 114 and shared with one or more other vehicle systems such as a vehicle central processing unit. Although the VSM's 110 are shown separate from the telematics unit 114, it is possible for any combination of these VSM's 110 to be integrated within the telematics unit 114. Furthermore, the telematics unit 114 could include additional components not shown here, or could omit some of the components shown here.

Communication System(s)

The wireless communication system 104 includes an analog or digital cellular network 136, a wireless computer network such as a wide area network (not shown), or any other suitable wireless network used to transmit voice and data signals between the vehicle 102 and various remote locations such as the call center 108 and/or service center 111. In one embodiment, the cellular network 136 is implemented as a CDMA, GSM, or other cellular communication network that exchanges voice and data between the vehicle 102 and the second communication system 106. Additionally or alternatively, wireless communication can be carried out by satellite transmission using one or more satellites 138 to connect the vehicle 102 to the second communication system 106 via a central, ground-based satellite transceiver 140.

The second communication system 106 can be another wireless communication system or can be a land-based wired system such as a public switched telephone network (PTSN), an Internet Protocol (IP) network, an optical network, fiber network, or other cable network, and/or any combination of the aforementioned examples, any of which can be used for voice and/or data communication. Those skilled in the art will recognize that the communication systems 104, 106 can be implemented separately or can be combined as an integral system.

Call Center

The call center 108 includes one or more locations and can be automated and/or staffed by advisors 142 to handle calls from vehicle occupants and/or to monitor various vehicle conditions such as an airbag deployment. The call center 108 includes one or more voice and/or data interfaces 144 such as modems, switches, and/or routers, to transmit and receive voice and/or data signals between the vehicle telematics unit 114 and the call center 108 through the communications systems 104, 106. The call center 108 also includes one or more communication service managers 146, one or more servers 148 to process data, one or more suitable databases 150 to store subscriber data and any other suitable data, and one or more networks 152 such as a LAN for connecting the call center components together along with the any computer(s) used by the one or more advisors 142. For example, the servers 148 and databases 150 execute and store one or more speech recognition programs and speech recognition data to carry out ASR, either alone or in conjunction with the telematics unit 114 of the vehicle 102. Suitable call center facilities are known and currently in use to provide remote assistance by human advisors in connection with in-vehicle safety and security systems. Apart from using human advisors, the advisors 142 can be implemented as automatons or programs running on a computer operatively disposed to respond to subscriber requests.

Web Server

The integration of the web server 109 with the system 100 enables a vehicle occupant to access websites and other content over the Internet, all from the vehicle using automated speech recognition technology and text-to-voice technology such as VoiceXML, or the like. For example, a vehicle occupant can use the telematics unit 114 and embedded speech recognition to ask for information, such as by vocalizing a command like "weather" or by speaking a nametag associated with a particular website address. The speech recognition technology recognizes the command or nametag and translates the request into suitable web language such as XML (Extensible Markup Language) and/or associate the request with a stored user profile, which correlates the request to a specific website. The web server 109 interprets the request, accesses and retrieves suitable information from the website according to the request, and translates the information into VoiceXML and then transmits a corresponding voice data file to the vehicle 102 where it is processed through the telematics unit 114 and output to the occupant via the user interface 128.

The web server 109 is implemented using one or more computer servers located either at an independent remote location or, for example, at the call center 108. If desired, the web server 109 can be integrated into the call center 108 rather than utilizing two separate systems. The exemplary server 109 includes a suitable communication interface 154 such as a modem, switch, and/or router, a computer 156, and a database 158 all connected by a suitable network 160 such as an Ethernet LAN. The database 158 can be implemented using a separate network attached storage (NAS) device or can be stored on the computer 156 itself, or can be located elsewhere, as desired. The computer 156 can have a server application program that controls the exchange of data between the vehicle 102 and the database 158 via the communication systems 104, 106. The web server 109 can also communicate with the call center 108 and/or the service center 111 either via the second communication system 106 or by some more direct path. Suitable server hardware and software configurations are known to those skilled in the art.

Service Center

The service center 111 can be a vehicle service center such as a dealership where vehicle maintenance and repair is carried out. The service center 111 is connected by the communication systems 104, 106 with the vehicle 102 so that a vehicle occupant can initiate a telephone call with a technician or service scheduler at the service center 111.

Exemplary ASR System

In general, a human user vocally interacts with an automatic speech recognition system for one or more fundamental purposes: to train the system to understand the user's voice; to store discrete speech such as a spoken nametag or a spoken control word like a numeral or keyword; or to use the recognition system to have the user's speech recognized and used for some useful end purpose such as voice dialing, menu navigation, transcription, or the like. In general, ASR extracts acoustic data from human speech, compares/contrasts the acoustic data to stored subword data, selects an appropriate subword which can be concatenated with other selected subwords, and outputs the corresponding subwords or words for post-processing such as dictation or transcription, address book dialing, storing to memory, training ASR models, or the like.

ASR systems are generally known to those skilled in the art, and FIG. 2 illustrates an exemplary specific architecture for an ASR system 210 to provide exemplary context for the method described herein below. The system 210 includes a device to receive speech such as the telematics microphone 132 and an acoustic interface 133 such as the telematics soundcard to digitize the speech into acoustic data. The architecture 210 also includes a memory such as the telematics memory 122 for storing the acoustic data and storing speech recognition software and databases, and a processor such as the telematics processor 116 to process the acoustic data. The processor 116 uses the speech recognition databases, a front-end processor or pre-processor software module 212 for parsing streams of acoustic data into parametric representations such as acoustic features, a decoder software module 214 for decoding the acoustic features to yield digital subword or word output data corresponding to the input speech utterances, and a post-processor software module 216 for using the output data from the decoder module 214 for any suitable purpose, including providing training feedback to other ASR models.

One or more modules or models can be used as input to the decoder module 214. First, grammar or lexicon model(s) 218 provide rules governing which words or sub-words can logically follow other words or sub-words to form valid sentences. In a broad sense, a grammar also defines a universe of vocabulary the system expects at any given time in any given ASR mode. For example, if the system 210 is in a training mode for training commands, then an active grammar model 218 can include all commands known to and used by the system 210. In another example, if the system 210 is in a main menu mode, then the active grammar model(s) 218 can include all main menu commands expected by the system 210 such as call, dial, exit, delete, directory, or the like. Second, acoustic model(s) 220 assist with selection of most likely subwords or words corresponding to input from the pre-processor module 212. Third, word model(s) 222 and sentence/language model(s) 224 provide syntax and/or semantics in placing the selected subwords or words into word or sentence context. Also, the sentence/language model(s) can define a universe of sentences the system expects at any given time in any given ASR mode and/or can provide rules governing which sentences can logically follow other sentences to form valid extended speech.

According to an alternative exemplary embodiment, some or all of the ASR system 210 can be resident on, and processed using, computing equipment in a location remote from the vehicle 102, such as the call center 108, web server 109, or the like. For example, grammar models, acoustic models, and the like can be stored in memory of one of the servers 148 and/or databases 150 in the call center 108 and communicated to the vehicle telematics unit 114 for in-vehicle speech processing. Similarly, speech recognition software such as HMM decoders can be processed using processors of one of the servers 148 in the call center 108. In other words, the ASR system 210 can be distributed across the call center 108 and the vehicle 102 in any desired manner. Likewise, the methods described herein can be carried out entirely by the telematics unit 114 of the vehicle 102, by the computing equipment in the call center 108, or by any combination thereof.

Extracting Acoustic Data

First, acoustic data is extracted from human speech wherein a user speaks into the microphone 132, which converts the utterances into electrical signals and communicates such signals to the acoustic interface 133. A sound-responsive element in the microphone 132 captures the user's speech utterances as variations in air pressure and converts the utterances into corresponding variations of analog electrical signals such as direct current or voltage. The acoustic interface 133 receives the analog electrical signals, which are first sampled such that values of the analog signal are captured at discrete instants of time, and are then quantized such that the amplitudes of the analog signals are converted at each sampling instant into streams of digital data. In other words, the acoustic interface 133 converts the analog signals into digital electronic signals. The digital data are binary bits which are buffered in the telematics memory 122 and then processed by the telematics processor 116 or can be processed as they are initially received by the processor 116 in real-time.

Pre-Processing

Second, the pre-processor module 212 transforms the continuous stream of digitized speech data into discrete sequences of acoustic parameters. More specifically, the processor 116 executes the pre-processor module 212 to segment the digital speech data into overlapping phonetic frames of, for example, 10-30 ms duration. The frames correspond to acoustic subwords such as syllables, demi-syllables, phones, diphones, phonemes, or the like. The pre-processor module 212 also performs phonetic analysis to extract acoustic parameters, such as time-varying feature vectors, from within each frame. Utterances within the user's speech are represented as sequences of these feature vectors. For example, and as known to those skilled in the art, 39 feature vectors can be extracted and can include, for example, vocal pitch, energy profiles, or spectral attributes, and/or cepstral coefficients that can be obtained by performing Fourier transforms of the frames and decorrelating acoustic spectra using cosine transforms. Thus, an unknown test pattern of speech is a concatenation of related acoustic frames and corresponding parameters covering a particular duration of speech.

Decoding

Third, the processor executes the decoder module 214 to process incoming feature vectors of each test pattern. The decoder module 214 is also known as a recognition engine or classifier and uses stored known reference patterns of speech. Like the test patterns, the reference patterns are defined as a concatenation of related acoustic frames and corresponding parameters. The decoder module 214 compares and contrasts the acoustic feature vectors of a subword to be recognized with stored subword models or patterns, assesses the magnitude of the differences or similarities therebetween, and ultimately uses decision logic to choose a best matching subword from the models as the recognized subword. The best matching subword is typically that which corresponds to the stored known reference pattern that has the minimum dissimilarity to, or highest probability of being, the test pattern.

Recognized subwords can be used to construct words with help from the word models 222 and to construct sentences with the help from the language models 224. The decoder module 214 can use various techniques known to those skilled in the art to analyze and recognize subwords, including but not limited to dynamic time-warping classifiers, artificial intelligence techniques, neural networks, free phoneme recognizers, and probabilistic pattern matchers such as Hidden Markov Models (HMM).

Hidden Markov Models are known those skilled in the art and produce multiple speech recognition hypotheses of the acoustic input which hypotheses are considered in ultimately identifying that recognition output which represents the most probable correct decoding of the acoustic input. More specifically, an HMM is a statistical model that yields an "N-best" list of subword hypotheses ranked according to HMM-calculated confidence values or probabilities of an observed sequence of acoustic data given one or another subword, such as by the application of Bayes' Theorem. A Bayesian HMM process identifies the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. To identify words, individual HMM's for a sequence of subwords can be concatenated to establish word HMM's.

Methods of Distinguishing Speech

A method of distinguishing out-of-vocabulary speech from in-vocabulary speech is provided herein and can be carried out using the architecture of the ASR system 210 within the operating environment of the telematics system 100 described above. Those skilled in the art will also recognize that the method can be carried out using other ASR systems within other operating environments.

In general, a user may desire to speak a command to have the ASR or its host device to take some action, such as place a telephone call, browse the Internet, or hear a list of names. For example, a user can say "directory" in order to hear a list of all stored addressees in the user's address list. In a discrete speech storage mode of the ASR system 210, the user inputs a spoken command into the system 210 by vocalizing the command into the microphone 132. In the system 210, the command word is first pre-processed, then decoded, and subsequently compared to a list of in-vocabulary commands.

Command words can be pre-processed and decoded on the word level or the subword level. For word level recognition, the pre-processor module 212 divides the command word utterance into a constituent series of feature vectors. Then the speech recognition decoder 214 receives and processes the feature vectors using suitable acoustic models and algorithms to generate an N-best list of word templates. Alternatively, for subword recognition, the pre-processor module 212 divides the command word utterance into its acoustic constituent subwords, which are then further subdivided into a constituent series of feature vectors. Then the speech recognition decoder 214 receives and processes the feature vectors using suitable acoustic models and algorithms to generate an N-best list of subword templates. Thereafter, the best templates are concatenated with one other and used to generate a recognized word.

As used herein, the term templates is interchangeable with models, waveforms, reference patterns, exemplars, hypotheses, or other types of references. A template can include a series of feature vectors representative of a word or subword and can be based on particular speakers, speaking styles, and audible environmental conditions. Those skilled in the art will recognize that templates may be generated by suitable template training of the ASR system and stored in memory. Those skilled in the art will also recognize that stored templates may be manipulated, wherein parameter values of the templates are adapted based on differences in speech input signals between template training and actual use of the ASR system. For example, a set of templates trained for one ASR user or certain acoustic conditions can be adapted and saved as another set of templates for a new ASR user or new acoustic conditions, based on a limited amount of training data from the new user or the new acoustic conditions. In other words, the templates are not necessarily fixed and can be processed during speech recognition.

Word recognition can be improved by distinguishing between in-vocabulary speech and out-of-vocabulary speech using a multiple pass recognition technique. In general, a first speech recognition pass is carried out wherein speech is processed using a decoder in light of a first set of vocabulary. This vocabulary can include acceptable or expected words within a certain grammar. If the confidence in the decodings of the speech is not sufficiently high, then a second speech recognition pass is carried out wherein the speech is processed using a decoder in light of a second set of vocabulary that includes unacceptable or unexpected words. If none of the decodings of the speech from the second pass is in the list of the decodings from the first pass, then the speech is determined to be out-of-vocabulary. Accordingly, speech recognition performance may be increased by such an improvement in out-of-vocabulary rejection because the user need not be prompted with a list of acceptable commands at every juncture and need not be asked repeatedly for the right command.

Figure 3:
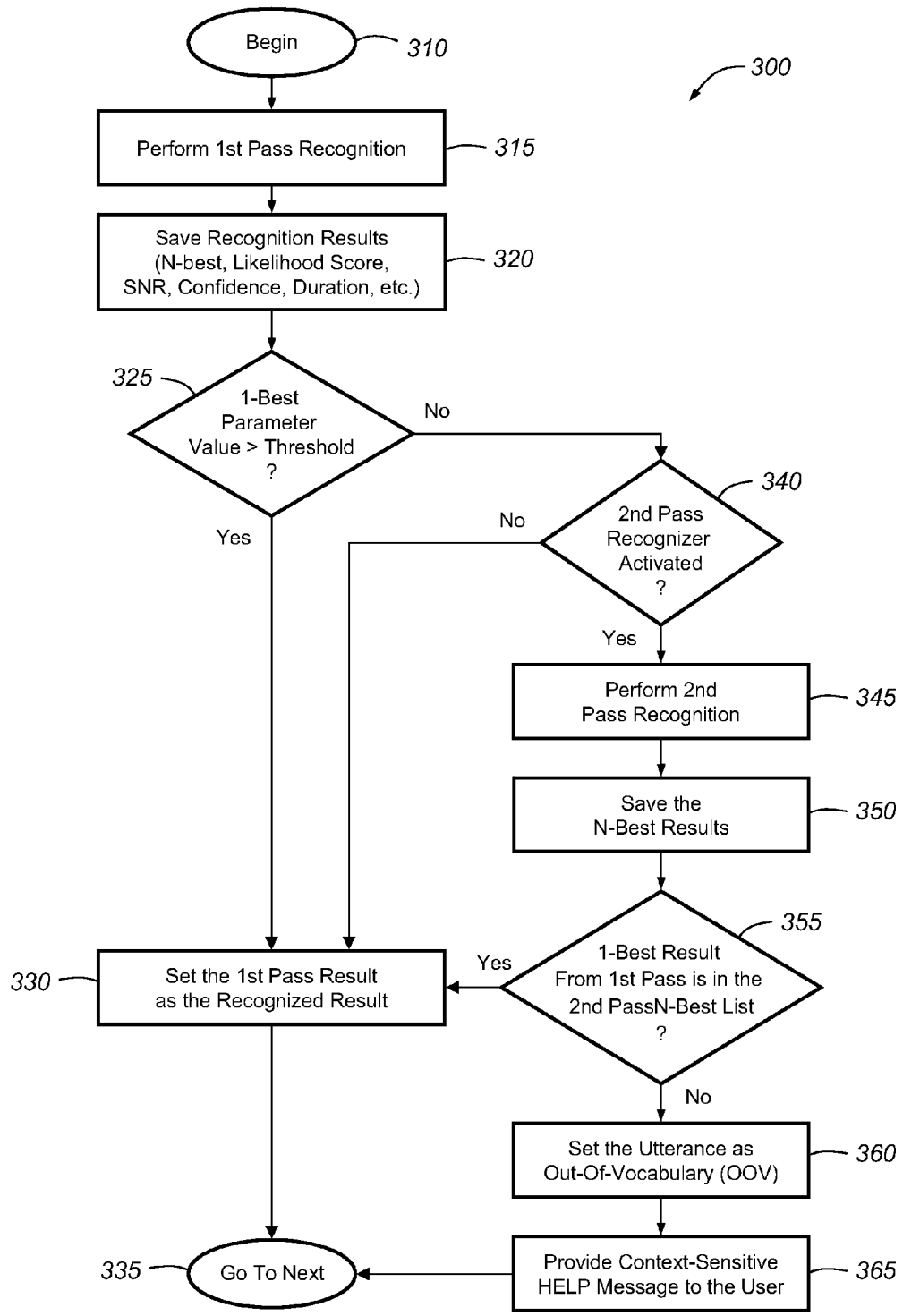
FIG. 3 is a flow chart of an embodiment of an exemplary method of distinguishing out-of-vocabulary speech from in-vocabulary speech, which can be carried out using the telematics system and ASR architecture of FIGS. 1 and 2.

FIG. 3 illustrates an exemplary method 300 of distinguishing between in-vocabulary speech and out-of-vocabulary speech, as discussed in detail below.

At step 310, a vehicle user starts interaction with the user interface of the telematics unit 114, preferably by depressing the user interface pushbutton 130 to begin a session in which the user inputs voice commands that are interpreted by the telematics unit 114 while operating in speech recognition mode. Using the speaker 134, the telematics unit 114 acknowledges the pushbutton activation by playing a sound or providing a verbal request for a command from the user or occupant. The telematics unit 114 preferably receives voice input, or further pushbutton input, to request certain desired functionality from the telematics unit 114. For example, the telematics unit 114 can receive an audible command from the user such as "Phone Home" from an occupant via the user interface microphone 132. The ASR-enabled telematics unit 114 receives the command utterance from the user, such as through the user interface microphone 132.

At step 315, a first pass of speech recognition is carried out. Here, the command utterance is processed by the telematics unit 114 using any suitable decoder module to recognize words, or subwords such as phonemes, that define the spoken command. As used herein, the term command includes a single command and/or one or more command templates. Those skilled in the art recognize that command templates are alternative interpretations or representations of a given command.

The user's input speech or command utterance is processed using an in-vocabulary grammar, which is stored in memory and associated with the current dialog with the user. For example, if the user is in a main menu dialog with the system, then the in-vocabulary grammar will include a finite quantity of main menu option commands such as Call, Dial, Exit, Delete, Directory, and the like.

Using the in-vocabulary grammar and any suitable decoder algorithm(s) and acoustic model(s), the processor accesses from memory several templates interpretive of the spoken command. For example, the processor can generate, and store to memory, a list of N-best vocabulary results or templates, along with corresponding parameter values. Exemplary parameter values can include confidence scores of each template in the N-best list of vocabulary and associated segment durations, likelihood scores, signal-to-noise (SNR) values, and/or the like. The N-best list of vocabulary can be ordered by descending magnitude of the parameter value(s). For example, the vocabulary template with the highest confidence score is the first best template, and so on.

At step 320, the recognition results, including the list of N-best vocabulary and associated parameter values, are saved for further processing.

At step 325, the first best vocabulary result or template of the N-best list is analyzed to determine whether that vocabulary will be used as the recognized speech or vocabulary contained in the user's speech. More specifically, one or more parameter values associated with the first best template are compared to a set threshold value. Any suitable threshold values are used and different threshold values can be used for different dialogs between the user and the ASR system. In this way, the recognition engine decoder algorithm(s) can be "tuned" for desired performance. For example, a confidence score threshold value can be set to 25% in certain dialogs such as nametag recognition dialogs, and can be set 70% for certain other dialogs such as those that require a 'Yes' or 'No' answer. Other exemplary parameter values that can be compared include likelihood scores, SNR's, or the like.

If, at step 325, it is determined that the parameter value(s) is greater than the threshold value, then the first best template will be used as the vocabulary contained in the user's speech as shown in step 330. Thereafter, the present method 300 terminates at step 335, whereafter any other suitable ASR processing or post-processing occurs.

If, however, at step 325, it is determined that the parameter value(s) is not greater than the threshold value, then the method 300 proceeds to step 340. For example, the command word "Phone" is not an in-vocabulary word and, thus, would likely not yield a word template with a parameter value greater than the threshold value.

At step 340, it is determined whether a second pass recognition path is activated or enabled. For example, the second pass recognition path can be enabled or disabled depending, during any given dialog, on a likelihood of the user speaking an out-of-vocabulary utterance. In one variation, the second pass can be disabled for routine dialogs that require easily recognizable responses such as 'Yes' or 'No.'

In another variation on step 340, the second pass can be enabled by default, the frequency of out-of-vocabulary utterances monitored, and the second pass automatically disabled if the monitored frequency of out-of-vocabulary utterances falls below any suitable predetermined threshold. As one specific example, if out-of-vocabulary utterances are encountered less than 10% of the time in any given dialog and/or for any given user, then the second pass can be disabled.

According to an additional variation on step 340, the second pass can be enabled depending on characteristics of the user, such as whether the user is a novice to the ASR system. In such a case, the second pass can be enabled for each and every dialog and can encourage the novice to learn to use the system by allowing the novice to speak what seems to make sense to that user. Over time, and through occasional correction and guidance by the system, use of the system will thereby become intuitive to the user.

In still another variation on step 340, the second pass can be enabled for only certain predetermined grammar types, such as those grammars that system designers know from experience to be susceptible to unusually high occurrences of out-of-vocabulary speech. For example, the second pass could be enabled for rarer dialogs that require atypical commands. Nonetheless, the second pass can be enabled for any, all, or no dialogs.

If, at step 340, it is determined that the second pass is disabled, then the method 300 proceeds to step 330, wherein the first best template is used as the vocabulary contained in the user's speech. Otherwise, if the second pass is enabled, then the method 300 proceeds to step 345.

At step 345 a second pass of speech recognition is carried out. Here, the command utterance is again processed by the telematics unit 114 using any suitable decoder module to recognize words, or subwords such as phonemes, that define the spoken command. Again, the recognition can be carried out on the word or subword level. For this pass, however, the user's input speech or command utterance can be recalled from memory and processed using out-of-vocabulary word templates, which can be stored in memory and associated with the current dialog with the user.

The grammar or vocabulary for the second pass is preferably pre-defined and can be created in any suitable manner. In one variation, the vocabulary could include all of the out-of-vocabulary words that the user could possibly speak or that the user could reasonably be expected to speak. In another variation, some or all of the expected words from other grammars and dialogs could be used. In a further variation, the method could use a limited large vocabulary set that does not contain the in-vocabulary words or does not contain triphones or pentaphones of the in-vocabulary words. In any case, the in-vocabulary words are preferably added to the compiled out-of-vocabulary words to complete the second pass grammar or vocabulary. In other words, the second pass grammar preferably includes the first pass grammar. The ASR system can include many different second pass vocabulary lists, which can be tailored by grammar and can be updated automatically or by request.

Using the second pass vocabulary and any suitable decoder algorithm(s) and acoustic model(s), the processor identifies several templates interpretive of the spoken command. For example, the processor can generate, and store to memory, a second pass list of N-best vocabulary results or templates, along with corresponding parameter values. The size of the N-best list of vocabulary, or the number of templates therein, can be determined in any suitable manner. For example, the size can depend on the particular demands of any given ASR application and on the current grammar, and the like. Exemplary parameter values can include confidence scores of each vocabulary result or template in the N-best list and associated segment durations, likelihood scores, SNR values, and/or the like. The N-best list of vocabulary can be ordered by descending magnitude of the parameter value(s).

At step 350, the second pass recognition results are saved, including the N-best vocabulary templates and associated parameter values. The templates and parameter values are saved for further analysis in light of the templates and parameter values from the first pass, as discussed with regard to step 355.

At step 355, the results of the N-best lists of the first and second passes are analyzed to determine whether one of the templates from the first pass will be used as the vocabulary contained in the user's speech in step 330, or whether the user's speech will be rejected as being out-of-vocabulary in step 360. In one variation, if any vocabulary result or template from the second pass N-best list is also present in the first pass N-best list, then that vocabulary result or template could be used as the vocabulary contained in the user's speech. In a further variation, if one of the top vocabulary results or templates from the first pass is anywhere within the second pass N-best list, then that top result or template could be used as the vocabulary contained in the user's speech. More specifically, if the first best template from the first pass is anywhere within the second pass N-best list, then that top template could be used as the vocabulary contained in the user's speech. Alternatively, if the top template from the first pass is anywhere within the top templates from the second pass, such as the top five templates for example, then that first pass top template could be used as the vocabulary contained in the user's speech. In any case, the second pass can be used to reinforce the likelihood that the first pass recognition at step 325 produced the most accurate decoding, even if the decoding resulted in a template with values less than a threshold value(s).

If, however, at step 355, it is determined that there is no overlap or commonality whatsoever between the N-best lists, then none of the first or second pass templates will be used as the vocabulary contained in the user's speech. Instead, the user's utterance will be treated as out-of-vocabulary with respect to the current grammar. Thereafter, at step 360, a context sensitive help message is audibly played to the user. For example, the system can play a pre-recorded message saved in memory to the user such as "you may have spoken an unavailable command in the current dialog, please choose among the following commands . . . ". Moreover, the system can provide any other suitable guidance to the user. Accordingly, the user will receive active, context-sensitive guidance from the system that is preferably limited to certain instances, such as when the user has already misspoken.

According to another variation of the method 300, any suitable number of additional passes can be made. In other words, a third pass, similar to the second pass, can be carried out after step 355 and before step 360.

According to a further variation of the method 300, the multiple pass procedure can be disabled if latency between the second pass and first pass is unacceptably burdensome to the user. This can be useful in situations where there is a dialog in process between the user and the ASR system and delays in response by the system are undesirable. Thus, for example, it is determined whether latency between step 325 and step 345 falls outside a defined period and, if so, skipping steps 345-365 and redefining the first grammar to also include the second grammar. In this variation, speech recognition would be carried out substantially as described with respect to steps 310 through 335, with a couple of exceptions. First, at step 315, the first pass vocabulary would be expanded or redefined to include the second pass vocabulary. Second, at step 325, if the parameter value(s) are not greater than the set threshold value, then the method skips steps 340 through 355 and proceeds directly to step 360. This method variation could be deployed manually by user request, or automatically under any desired pre-defined circumstances.

It is to be understood that the foregoing description is not a description of the invention itself, but of one or more preferred exemplary variations of the invention. The invention is not limited to the particular variation(s) disclosed herein, but rather is defined solely by the claims below. Furthermore, the statements contained in the foregoing description relate to particular variations and are not to be construed as limitations on the scope of the invention or on the definition of terms used in the claims, except where a term or phrase is expressly defined above. Various other variations and various changes and modifications to the disclosed variation(s) will become apparent to those skilled in the art. All such other variations, changes, and modifications are intended to come within the scope of the appended claims.

As used in this specification and claims, the terms "for example" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:
1. A speech recognition method comprising the steps of:
(a) receiving input speech from a user via a microphone associated with an automatic speech recognition system;
(b) processing the input speech using a first grammar to obtain parameter values of a first N-best list of vocabulary using at least one processor associated with the automatic speech recognition system;
(c) comparing at least one parameter value of a top result of the first N-best list to at least one predetermined threshold value; and
(d) subsequently processing the input speech using a second grammar to obtain parameter values of a second N-best list of vocabulary, if the compared at least one parameter value is below the at least one predetermined threshold value;

(e) determining the input speech to be in-vocabulary, if any of the results of the first N-best list is also present within the second N-best list, but out-of-vocabulary if any of the results of the first N-best list is not within the second N-best list; and (f) providing audible feedback to the user if the input speech is determined to be out-of-vocabulary.

2. The method of claim 1, wherein the at least one parameter value is at least one of a confidence score, segment duration, likelihood score, or signal-to-noise ratio.

3. The method of claim 1, wherein step (d) is disabled if frequency of out-of-vocabulary utterances falls below a predetermined threshold.

4. The method of claim 3, wherein the top result from step (c) is determined to be the vocabulary contained in the user's speech.

5. The method of claim 1, wherein step (d) is enabled if the user is a novice to the system.

6. The method of claim 1, wherein step (d) is enabled for predetermined types of grammar.

7. The method of claim 1, further comprising the step of creating the second grammar by generating a limited set of vocabulary that includes in-vocabulary within the first grammar.

8. The method of claim 1, further comprising the step of creating the second grammar by combining two or more other grammars used by a speech recognition system used to implement the method.

9. The method of claim 1, further comprising the step of creating the second grammar by generating a limited set of vocabulary that does not include in-vocabulary of the first grammar.

10. The method of claim 1, further comprising the step of creating the second grammar by generating a limited set of vocabulary that does not include triphones or pentaphones of words of the in-vocabulary first grammar.

11. The method of claim 7, wherein step (e) includes determining the input speech to be in-vocabulary, if one of the top results of the first N-best list is also present within the second N-best list, but out-of-vocabulary if none of the top results of the first N-best list is within the second N-best list.

12. The method of claim 11, wherein step (e) includes determining the input speech to be in-vocabulary, if the top result of the first N-best list is also present within the second N-best list, but out-of-vocabulary if the top result of the first N-best list is not within the second N-best list.

13. The method of claim 11, wherein step (e) includes determining the input speech to be in-vocabulary, if the top result of the first N-best list is also present within the top results of the second N-best list, but out-of-vocabulary if the top result of the first N-best list is not within the top results of the second N-best list.

14. The method of claim 1, wherein the step (f) includes instructing the user to use vocabulary within the first grammar.

15. The method of claim 14, wherein the step (f) further includes providing a list of acceptable vocabulary within the first grammar.

16. The method of claim 1, further comprising determining whether latency between steps (b) and (d) falls outside a defined period and, if so, skipping step (d) and redefining the first grammar to also include the second grammar.

17. A speech recognition method for a telematics system that has a speech recognition system, the method comprising the steps of:

(a) receiving input speech from a user to be processed into recognized speech via a microphone associated with an automatic speech recognition system;

(b) processing the input speech using a first grammar to obtain parameter values of a first N-best list of probable vocabulary suggested by a decoder using at least one processor associated with the automatic speech recognition system;

(c) comparing at least one parameter value of a top result of the first N-best list to at least one predetermined threshold value;

(d) subsequently processing the input speech using a second grammar to obtain parameter values of a second N-best list of probable vocabulary suggested by the decoder, if the compared at least one parameter value is below the at least one predetermined threshold value; and (e) determining the input speech to be in-vocabulary, if any of the results of the first N-best list is also present within the second N-best list, but out-of-vocabulary if none of the results of the first N-best list is within the second N-best list, wherein the first grammar is different from the second grammar, and the first grammar includes in-vocabulary grammar and the second grammar includes out-of-vocabulary grammar; and (f) providing audible feedback to the user if the input speech is determined to be out-of-vocabulary.

18. A speech recognition method for a vehicle having a telematics unit with an embedded speech recognition system, the method comprising the steps of:

(a) receiving input speech from a user to be processed into recognized speech via a microphone associated with an automatic speech recognition system;

(b) processing the input speech using a first grammar to obtain parameter values of a first N-best list of probable vocabulary suggested by a decoder using at least one processor associated with the automatic speech recognition system;

(c) comparing at least one parameter value of a top result of the first N-best list to at least one predetermined threshold value, wherein the at least one parameter value is at least one of a confidence score, segment duration, likelihood score, or signal-to-noise ratio;

(d) subsequently processing the input speech using a second grammar to obtain parameter values of a second N-best list of probable vocabulary suggested by the decoder, if the compared at least one parameter value is below the at least one predetermined threshold value;

(e) determining the input speech to be in-vocabulary, if the top result of the first N-best list is also present within the second N-best list, but out-of-vocabulary if the top result of the first N-best list is not within the second N-best list; and (f) providing audible feedback to the user if the input speech is determined to be out-of-vocabulary, wherein the first grammar is different from the second grammar, and the first grammar includes in-vocabulary grammar and the second grammar includes out-of-vocabulary grammar.

* * * * *